United States Patent [19]
Naito et al.

[11] Patent Number: 5,342,544
[45] Date of Patent: Aug. 30, 1994

[54] LIQUID CRYSTAL COMPOSITION

[75] Inventors: Tomijiro Naito, Tokyo; Yumiko Sato, Saitama; Toshiro Yukinari, Yamanashi; Toshihiro Shibata, Saitama; Masaki Kimura, Saitama; Yukari Shinada, Saitama, all of Japan

[73] Assignees: Asahi Denka Kogyo Kabushiki Kaisha; Citizen Watch Co., Ltd., both of Tokyo, Japan

[21] Appl. No.: 968,152

[22] Filed: Oct. 26, 1992

[51] Int. Cl.$^5$ .................. C09K 19/06; C09K 19/30; C09K 19/12
[52] U.S. Cl. .................. 252/299.6; 252/299.63; 252/299.66; 252/56 R
[58] Field of Search .................. 252/299.63, 299.01, 252/299.67, 1, 56 R, 299.6; 560/1, 64; 562/493

[56] References Cited

U.S. PATENT DOCUMENTS

| | | | |
|---|---|---|---|
| 3,799,267 | 3/1974 | Ely et al. | 252/56 R X |
| 3,953,491 | 4/1976 | Steinstrasser et al. | 252/299.67 X |
| 4,453,201 | 9/1985 | Hayashi et al. | 252/299.1 |
| 4,526,704 | 7/1985 | Petrzilka et al. | 252/299.61 |
| 4,740,321 | 4/1988 | Davis et al. | 252/33.4 |
| 5,217,643 | 6/1993 | Yoshida et al. | 252/299.2 |

FOREIGN PATENT DOCUMENTS

| | | |
|---|---|---|
| 0023730 | 2/1981 | European Pat. Off. . |
| 0067538 | 4/1982 | Japan . |
| 085343 | 5/1982 | Japan . |
| 2072214 | 9/1981 | United Kingdom . |

OTHER PUBLICATIONS

"Thermal Properties of Binary Mixtures of Liquid Crystals", *Molecular Crystals and Liquid Crystals*, vol. 27, No. 3/4, 1974, By E. Hsu et al., pp. 269–304.
"Phase Diagrams of Binary Mixtures of Liquid Crystals", *Journal of the Chemical Society, Chemical Communications*, 1972, By J. Homer et al., pp. 926–927.
"4-(Polyfluoroalkyl)Benzoic and Cyclohexanecarboxylic Acids and Their 4-Cyanophenyl Esters", *Journal of Organic Chemistry of the USSR*, vol. 21, No. 11, Nov. 1985, By Y. Fialkov et al., pp. 2201–2205.

*Primary Examiner*—Robert L. Stoll
*Assistant Examiner*—C. Harris
*Attorney, Agent, or Firm*—Young & Thompson

[57] ABSTRACT

A nematic liquid crystal composition comprising at least one member selected from 4-alkyl- or 4-alkoxy-benzoic acids represented by the following general formula (I), particularly a nematic liquid crystal composition comprising a carboxylic acid mixture composed of at least one member selected from 4-alkyl- or 4-alkoxy-benzoic acids represented by the following general formula (I) and at least one member selected from 4-alkylcyclohexanecarboxylic acids represented by the following general formula (IV):

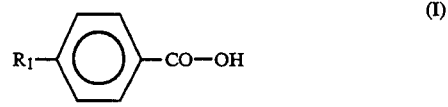

(I)

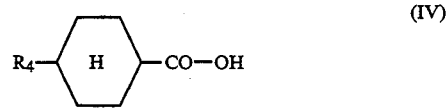

(IV)

wherein $R_1$ stands for an alkyl or alkoxy group having 1 to 12 carbon atoms and $R_4$ stands for an alkyl group having 1 to 12 carbon atoms.

9 Claims, No Drawings

LIQUID CRYSTAL COMPOSITION

BACKGROUND OF THE INVENTION

1. Field of the Invention

The present invention relates to a nematic liquid crystal composition containing a 4-alkylbenzoic acid or a 4-alkoxybenzoic acid, particularly a nematic liquid crystal composition containing a mixture of a 4,alkylbenzoic acid with a 4-alkylcyclohexanecarboxylic acid to be used as a liquid crystal display device.

2. Description of the Prior Art

With the spread of a liquid crystal display device wherein use is made of the electrooptical effect of a liquid crystal, the development of a liquid crystal having properties suitable for these applications has been desired in the art. Properties required of the liquid crystal used in a liquid crystal display device are as follows.

(1) The chemical stability of the liquid crystal is high.
(2) A liquid crystal phase is exhibited in a wide temperature range including room temperature.
(3) A good response can be attained in a wide temperature range.
(4) The matching with a driving circuit is good.
(5) The optical anisotropy can meet an optical requirement.

However, no single-component liquid crystal compound capable of meeting all of the above property requirements is known in the art, and the present situation is that a liquid crystal composition comprising a mixture of several kinds of liquid crystal compounds is used for satisfying the above various property requirements.

Examples of known liquid crystal compounds used in the preparation of such a liquid crystal composition are phenyl ester compounds of cyclic carboxylic acids such as an alkyl- or alkoxybenzoic acid and an alkylcyclohexanecarboxylic acid, aromatic nitrile compound, an alkyl- or alkoxybiphenyl derivative, an alkyl- or alkoxyterphenyl derivative and an alkylcyclohexanecarboxylic acid.

Among these compounds, a 4-alkylcyclohexanecarboxylic acid is characterized by having a relatively low viscosity and a wide temperature range in which a liquid crystal phase is exhibited. It is known that liquid crystal compositions containing such a 4-alkylcyclohexanecarboxylic acid are excellent in various properties. In recent years, however, there is an ever increasing demand for a liquid crystal composition capable of meeting more strict property requirements. In particular, a lowering in the response speed is desired in the art. None of the above-described known liquid crystal compositions can meet the demand, however, and they cannot be satisfactorily put to practical use.

The most effective method of improving the response speed of a liquid crystal composition is to lower the viscosity of the liquid crystal composition. Since, however, the lowering in the viscosity should not be detrimental to other properties, the development of a method of lowering the viscosity of a liquid crystal composition without detriment to other properties has been desired in the art.

SUMMARY OF THE INVENTION

The present inventors have conducted intensive studies with a view to improving various properties of a liquid crystal composition and, as a result, have found that the incorporation of a 4-alkyl or 4-alkoxybenzoic acid into a liquid crystal composition can provide a liquid crystal composition excellent in various properties. In particular, they have found that a mixture of a 4-alkyl- or 4-alkoxybenzoic acid with a 4-alkylcyclohexanecarboxylic acid has a viscosity much lower than that expected from the individual components of the mixture and the incorporation of this mixture into a nematic liquid crystal can provide a nematic liquid crystal composition excellent in other properties as well.

Accordingly, the present invention provides a nematic liquid crystal composition comprising at least one member selected from 4-alkyl- or 4-alkoxybenzoic acids represented by the following general formula (I), particularly a nematic liquid crystal composition comprising a carboxylic acid mixture of at least one member selected from 4-alkyl- or 4-alkoxybenzoic acids represented by the following general formula (I) with at least one member selected from 4-alkylcyclohexanecarboxylic acids represented by the following general formula (IV):

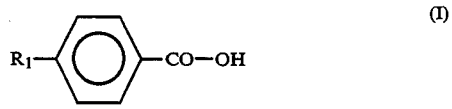

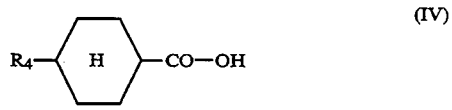

wherein $R_1$ stands for an alkyl or alkoxy group having 1 to 12 carbon atoms and $R_4$ stands for an alkyl group having 1 to 12 carbon atoms.

DETAILED DESCRIPTION OF THE INVENTION

In the compounds represented by the general formulae (I) and (IV), examples of the alkyl group having 1 to 12 carbon atoms represented by $R_1$ and $R_4$ include straight-chain and branched alkyl groups such as methyl, ethyl, propyl, isopropyl, n-butyl, isobutyl, n-pentyl, 1-methylbutyl, 2-methylbutyl, 3-methylbutyl, n-hexyl, 1-methylpentyl, 2-methylpentyl, 3-methylpentyl, 4-methylpentyl, n-octyl, 1-methylheptyl, 2-methylheptyl, 2-ethylhexyl, n-nonyl, n-decyl, n-undecyl and n-dodecyl. When the alkyl group is a branched one, it may be an optically active group. Examples of the alkoxy group having 1 to 12 carbon atoms represented by $R_1$ include alkoxy groups derived from the above-described alkyl groups.

The 4-alkyl- or 4-alkoxybenzoic acid represented by the general formula (I) and the 4-alkylcyclohexanecarboxylic acid represented by the general formula (IV) may be a single component or a mixture of several components. When use is made of a mixture of the 4-alkyl- or 4-alkoxybenzoic acid represented by the general formula (I) with the 4-alkylcyclohexanecarboxylic acid represented by the general formula (IV), the mixing ratio is not particulalry limited and may be in the range of from 5 : 95 to 95:5, preferably in the range of from 10 : 90 to 90 : 10.

The liquid crystal temperature ranges (MR) of the 4-alkyl- or 4-alkoxybenzoic acid compounds constituting the liquid crystal composition of the present invention are as follows:

| | |
|---|---|
| R = CH$_3$ | MR (°C.) = 182, |

-continued

| | |
|---|---|
| R = C₂H₅ | MR (°C.) = 113, |
| R = n-C₃H₇ | MR (°C.) = 143, |
| R = n-C₄H₉ | MR (°C.) = 99–113, |
| R = n-C₅H₁₁ | MR (°C.) = 88–126, |
| R = n-C₆H₁₃ | MR (°C.) = 97–114, |
| R = n-C₇H₁₅ | MR (°C.) = 101–120, |
| R = n-C₈H₁₇ | MR (°C.) = 99–112, |
| R = n-C₉H₁₉ | MR (°C.) = 98–115, |
| R = n-C₁₀H₂₁ | MR (°C.) = 94–109, |
| R = CH₃O | MR (°C.) = 184, |
| R = C₂H₅O | MR (°C.) = 196, |
| R = n-C₃H₇O | MR (°C.) = 145–154, |
| R = n-C₄H₉O | MR (°C.) = 147–160, |
| R = n-C₅H₁₁O | MR (°C.) = 124–151, |
| R = n-C₆H₁₃O | MR (°C.) = 105–153, |
| R = n-C₇H₁₅O | MR (°C.) = 92–146, |
| R = n-C₈H₁₇O | MR (°C.) = 101–147, |
| R = n-C₉H₁₉O | MR (°C.) = 94–143, |
| R = n-C₁₀H₂₁O | MR (°C.) = 97–142, and |
| R = n-C₁₁H₂₃O | MR (°C.) = 95–137. |

The present invention relates to a nematic liquid crystal composition produced by incorporating at least one member selected from 4-alkyl- or 4-alkoxybenzoic acids represented by the general formula (I), particularly at least one member selected from 4-alkyl- or 4-alkoxybenzoic acids represented by the general formula (I) and at least one member selected from 4-alkoxybenzoic acids represented by the general formula (I) and at least one member selected from 4-alkylcyclohexane-carboxylic acids represented by the general formula (IV) into a known nematic compound or nematic compound mixture, and examples of the nematic liquid crystal component into which the benzoic acid compound is incorporated include the following compounds and mixtures thereof:

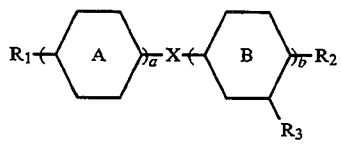
(2)

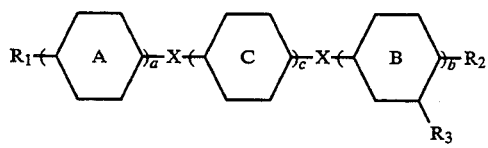
(3)

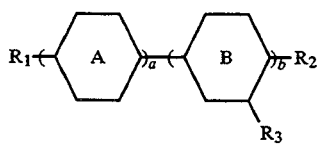
(4)

wherein $R_1$ and $R_2$ each stand for a hydrogen atom, a halogen atom, a hydroxyl group, a nitro group, a cyano group, an alkyl group having 1 to 12 carbon atoms, an alkoxy group having 1 to 12 carbon atoms, an alkenyl group having 2 to 12 carbon atoms, an alkenyloxy group having 2 to 12 carbon atoms, a carboxyl group or an alkoxycarbonyl group having $C_{1-12}$ alkyl group; $R_3$ stands for a hydrogen atom or a halogen atom; X stands for —O—, —CO—O—, —O—CO—, —CH₂O—, —OCH₂—, —CH₂CH₂—, —CH=CH— or —C≡C—; rings A and C each stand for a benzene ring, a trans-cyclohexane ring or a pyrimidine ring, ring B stands for a benzene ring or a trans-cyclohexane ring and a, b and c are each 1 to 3. When a plurality of identical symbols are present in the same molecule, they may be the same or different from each other.

Specific examples of the nematic liquid crystal compound include the following compounds:

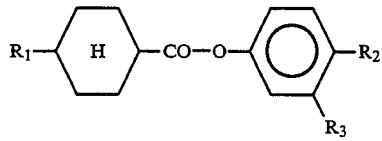

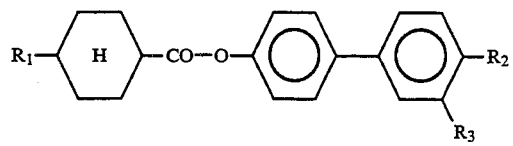

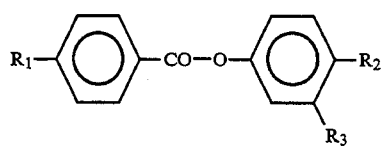

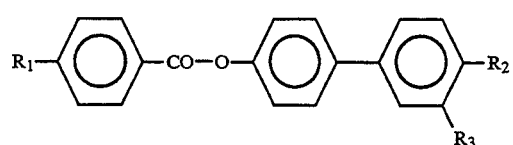

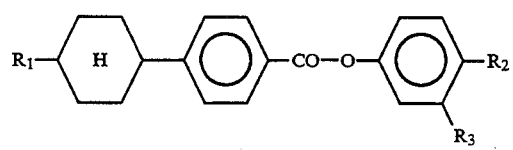

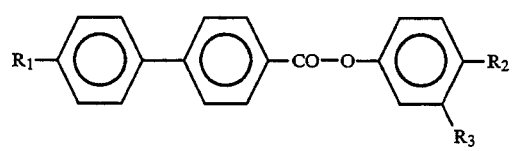

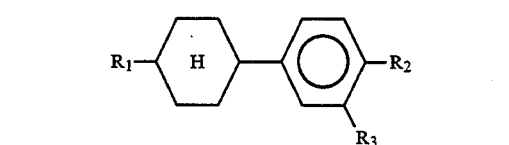

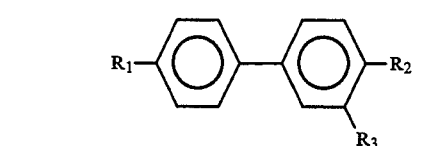

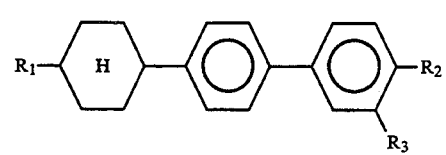

-continued

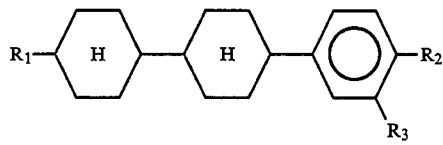

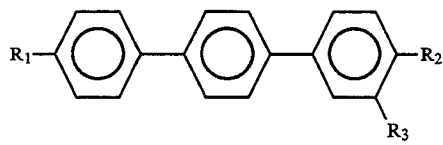

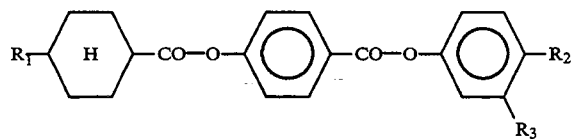

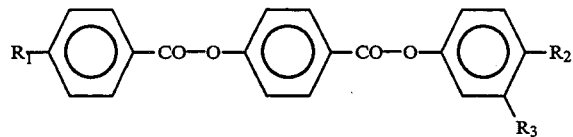

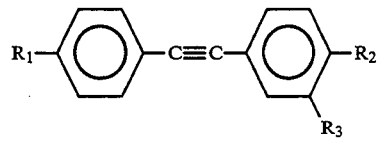

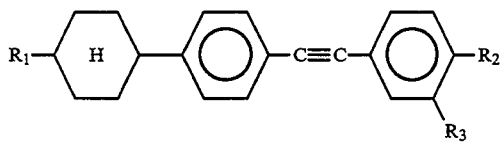

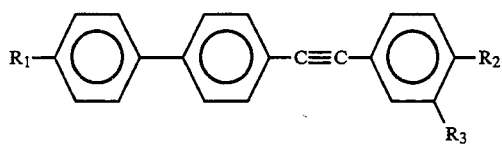

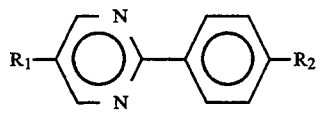

In order to prepare a liquid crystal composition having good properties, it is preferred to use, among the above-described compounds, a compound wherein $R_2$ stands for a cyano group, or a mixture containing a compound wherein $R_2$ stands for a cyano group. It is particularly preferred to use at least one member selected from the compounds represented by the general formula (II) and/or the general formula (III).

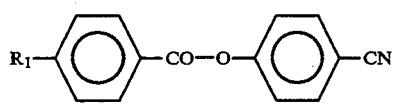

(II)

wherein $R_1$ stands for an alkyl or alkoxy group having 1 to 12 carbon atoms.

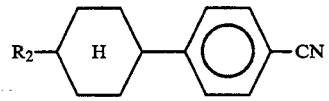

(III)

wherein $R_2$ stands for an alkyl group having 1 to 12 carbon atoms.

Although there is no particular limitation on the mixing ratio of the 4-alkyl- or 4-alkoxybenzoic acid compound to the nematic liquid crystal compound, it is generally preferred to use the 4-alkyl- or 4-alkoxybenzoic acid compound in an amount of 1 to 80 % by weight based on the whole liquid crystal composition. In order to incorporate both the 4-alkyl- or 4-alkoxybenzoic acid compound and the 4-alkylcyclohexanecarboxylic acid compound into the nematic liquid crystal compound, they may be mixed with each other before being incorporated into the nematic liquid crystal compound, or they may be separately incorporated into the nematic liquid crystal compound.

It is also possible to incorporate a non-liquid-crystal compound having a chemical structure similar to that of the nematic liquid crystal compound into the nematic liquid crystal composition of the present invention in such an amount as will not spoil the object of the present invention. In some cases, the incorporation of the non-liquid-crystal compound enables the properties of the liquid crystal composition to be further improved.

The present invention will now be described in more detail with reference to the following Examples, though it is not limited to these Examples only.

EXAMPLE 1

A nematic liquid crystal composition comprising the following components was prepared to measure the N-I point of the liquid crystal composition, viscosity ($\eta$: centipoise) of the liquid crystal composition at 20° C., anisotropy ($\Delta\epsilon$) of dielectric constant at 25° C., anisotropy ($\Delta n$) of refractive index at 25° C., and elastic constant at 25° C. The results were as follows. The nematic liquid crystal composition was very excellent from the practical viewpoint.

N-I point: 80° C., $\eta$: 43.6, $\Delta\epsilon$: 6.1, $\Delta n$: 0,127, and elastic constant: 1.28.

| Structure | % |
|---|---|
| n-C$_3$H$_7$—H—CO—O—⌬—CN | 23.3% |
| n-C$_4$H$_9$—H—CO—O—⌬—CN | 23.3% |
| n-C$_5$H$_{11}$—H—CO—O—⌬—CN | 23.3% |
| n-C$_4$H$_9$—⌬—CO—OH | 10.0% |

-continued

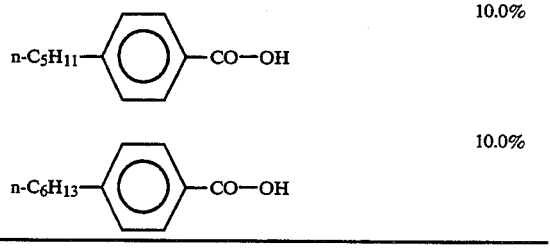

| | |
|---|---|
| n-C5H11–⟨⟩–CO—OH | 10.0% |
| n-C6H13–⟨⟩–CO—OH | 10.0% |

COMPARATIVE EXAMPLE 1

A nematic liquid crystal composition comprising the following components was prepared to measure the N-I point of the liquid crystal composition, viscosity of the liquid crystal composition, anisotropy of dielectric constant, and anisotropy of refractive index in the same manner as that of Example 1.

N-I point: 68° C., $\eta$: 47.0, $\Delta\epsilon$: 9.0, and $\Delta n$: 0,113.

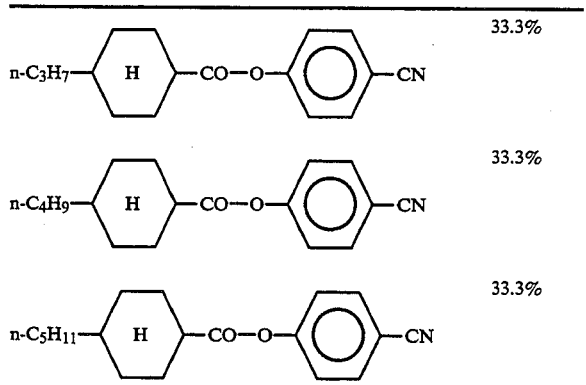

When the results of Example 1 are compared with those of Comparative Example 1, it is apparent that the addition of the alkylbenzoic acid according to the present invention serves to raise the N-I point, lower the viscosity, and increase the anisotropy of refractive index.

EXAMPLE 2

A nematic liquid crystal composition comprising the following components was prepared to measure the N-I point of the liquid crystal composition, viscosity of the liquid crystal composition, anisotropy of dielectric constant, anisotropy of refractive index, and elastic constant in the same manner as that of Example 1. The results were as follows. The nematic liquid crystal composition was very excellent from the practical viewpoint.

N-I point: 77° C., $\eta$: 24.7, $\Delta\epsilon$: 10.1, $\Delta n$: 0.131, and elastic constant: 1.30.

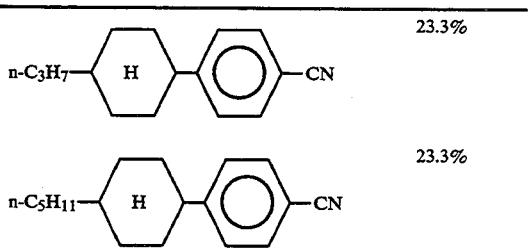

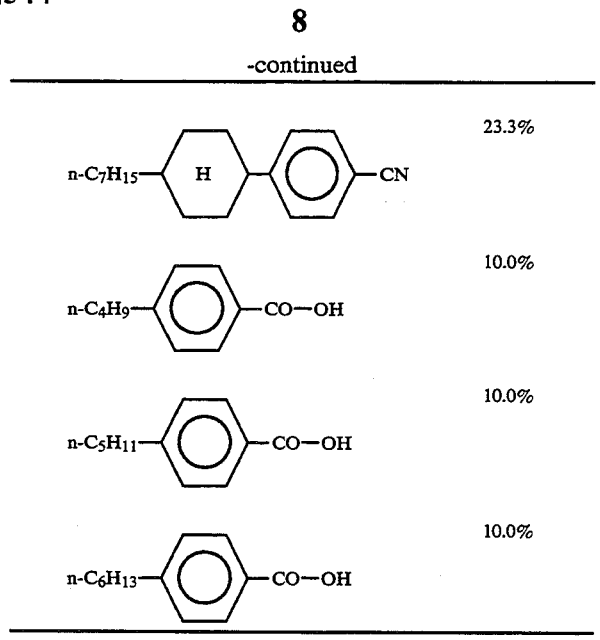

EXAMPLE 3

A nematic liquid crystal composition comprising the following components was prepared to measure the N-I point of the liquid crystal composition, viscosity of the liquid crystal composition, and anisotropy of refractive index in the same manner as that of Example 1. The results were as follows. The nematic liquid crystal composition was very excellent from the practical viewpoint.

N-I point: 66° C., $\eta$: 26.4, and $\Delta n$: 0,126.

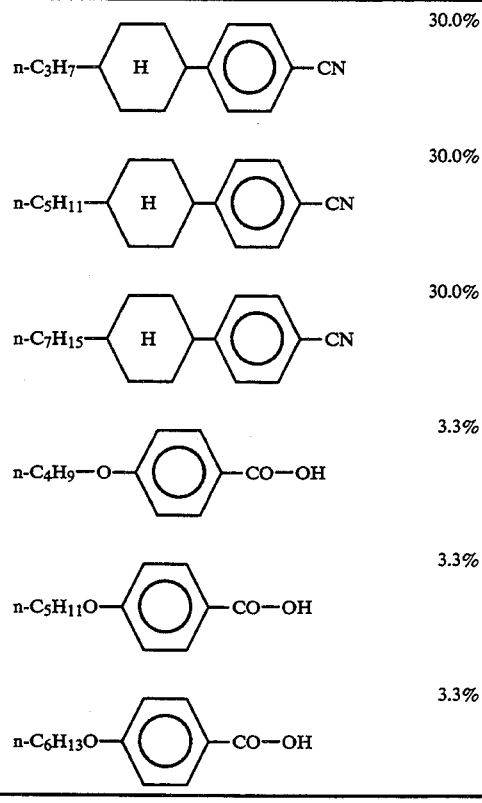

COMPARATIVE EXAMPLE 2

A nematic liquid crystal composition comprising the following components was prepared to measure the N-I point of the liquid crystal composition, viscosity of the liquid crystal composition, anisotropy of dielectric constant and anistropy of refractive index in the same manner as that of Example 1.

N-I point: 52° C., Δ: 22.1 Δε: 11.6, and Δn: 0.119.

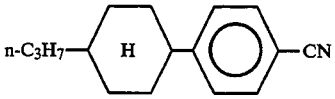  33.3%

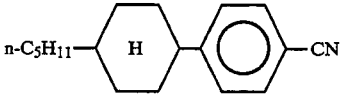  33.3%

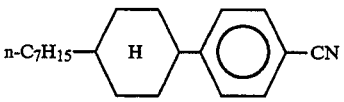  33.3%

When the results of Examples 2 and 3 are compared with those of Comparative Example 2, it is apparent that the addition of the alkylbenzoic acid according to the present invention serves to increase the N-I point, increases the anisotropy of refractive index, and hardly increases the viscosity.

EXAMPLE 4

A nematic liquid crystal composition comprising the following components was prepared to measure the N-I point of the liquid crystal composition, viscosity of the liquid crystal composition, anisotropy of dielectric constant, anisotropy of refractive index, and elastic constant in the same manner as that of Example 1. The results were as follows. The nematic liquid crystal composition was very excellent from the practical viewpoint.

N-I point: 65° C., η: 32.2, Δε: 6.1, Δn: 0.116, and elastic constant: 1.17.

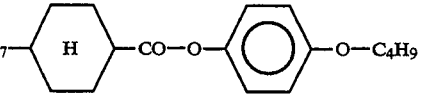  20.0%

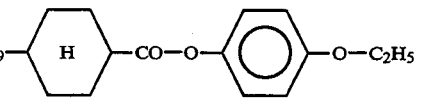  20.0%

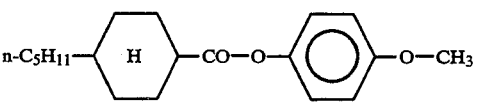  20.0%

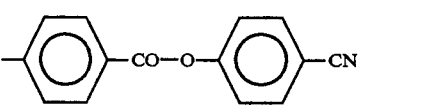  14.0%

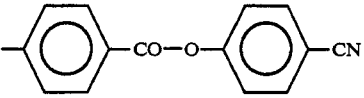  6.0%

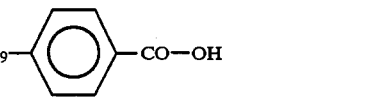  6.7%

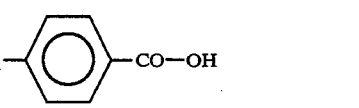  6.7%

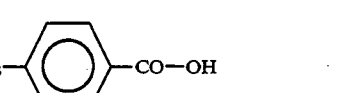  6.7%

EXAMPLE 5

A nematic liquid crystal composition comprising the following components was prepared to measure th N-I point of the liquid crystal composition, viscosity of the liquid crystal composition, anisotropy of dielectric constant, anisotropy of refractive index, and elastic constant in the same manner as that of Example 1. The results were as follows. The nematic liquid crystal composition was very excellent from the practical viewpoint.

N-I point: 73° C., η: 29.6, Δε: 9.9, Δn: 0.129, and elastic constant: 1.16.

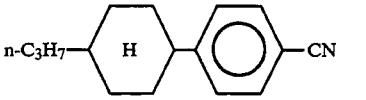  10.0%

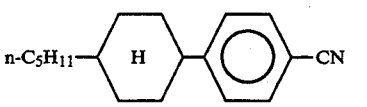  10.0%

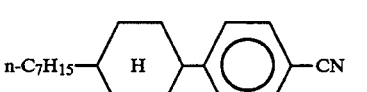  10.0%

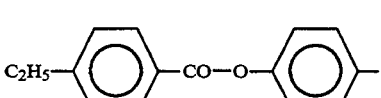  10.5%

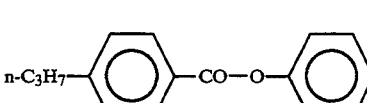  4.5%

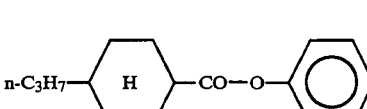  8.3%

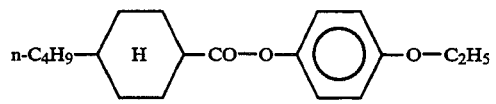 8.3%

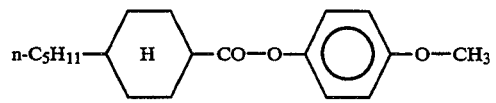 8.3%

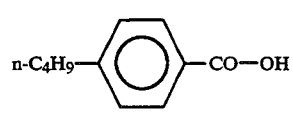 10.0%

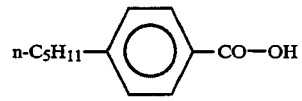 10.0%

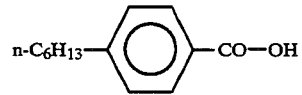 10.0%

EXAMPLE 6

A nematic liquid crystal composition comprising the following components was prepared to measure the N-I point of the liquid crystal composition, viscosity of the liquid crystal composition, viscosity of the liquid crystal composition, anisotropy of dielectric constant, anisotropy of refractive index, and elastic constant in the same manner as that of Example 1. The results were as follows. The nematic liquid crystal composition was very excellent from the practical viewpoint.

N*point*: 61° C., $\eta$: 29.0, $\Delta\epsilon$: 9.1, $\Delta$n: 0.114,

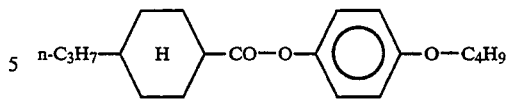 11.7%

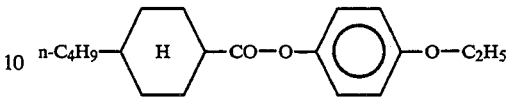 11.7%

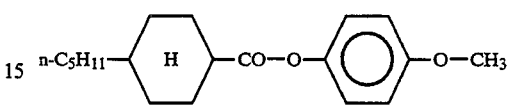 11.7%

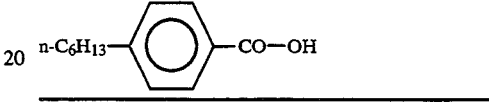 10.5%

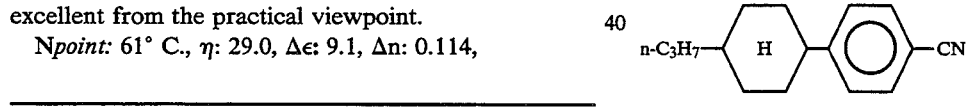 4.5%

 11.7%

 11.7%

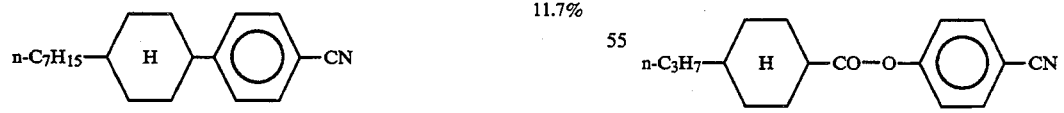 11.7%

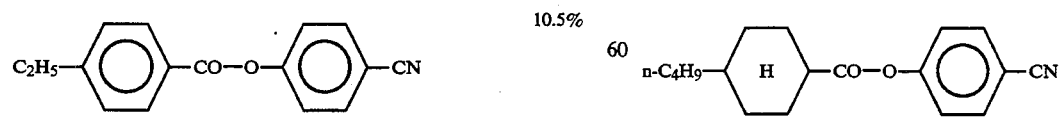 15.0%

EXAMPLE 7

A nematic liquid crystal composition comprising the following components was prepared to measure the N-I point of the liquid crystal composition, viscosity of the liquid crystal composition, anisotropy of dielectric constant, anisotropy of refractive index, and elastic constant in the same manner as that of Example 1. The results were as follows. The nematic liquid crystal composition was very excellent from the practical viewpoint.

N-I point: 78° C., $\Delta$: 31.8, $\Delta\epsilon$: 9.8, $\Delta$n: 0.141 , and elastic constant: 1.20.

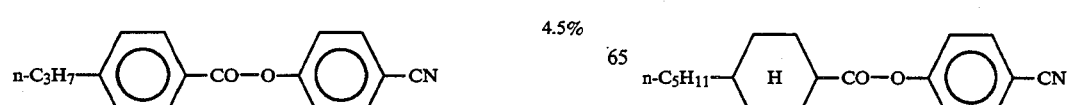 13.3%

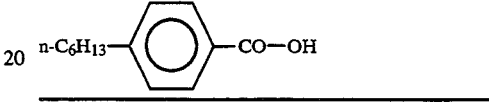 13.3%

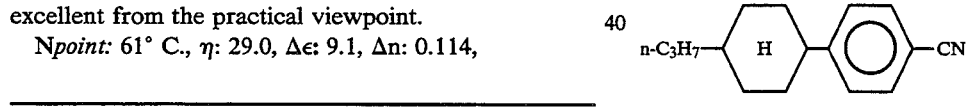 13.3%

 6.7%

 6.7%

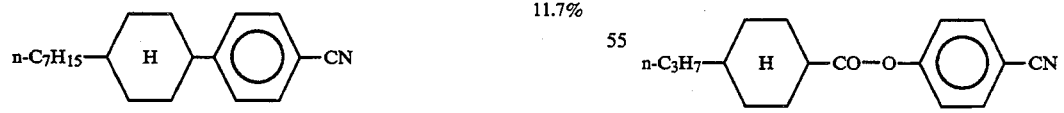 6.7%

-continued

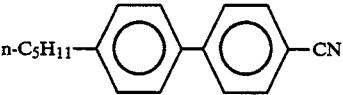 5.2%

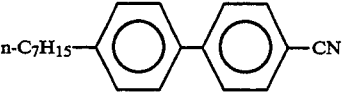 2.5%

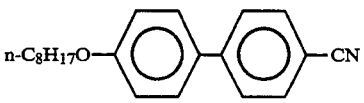 1.5%

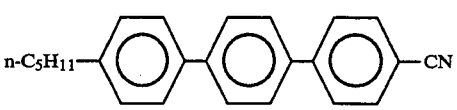 0.8%

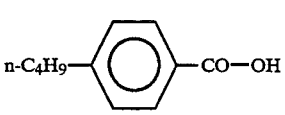 10.0%

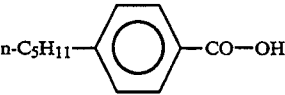 10.0%

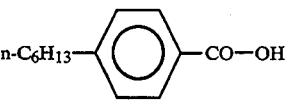 10.0%

EXAMPLE 8

A nematic liquid crystal composition comprising the following components was prepared to measure the N-I point of the liquid crystal composition, viscosity of the liquid crystal composition, anisotropy of dielectric constant, anisotropy of refractive index, and elastic constant in the same manner as that of Example 1. The results were as follows. The nematic liquid crystal composition was very excellent from the practical viewpoint.

N-I point: 65° C., $\eta$: 31.9, $\Delta\epsilon$: 10.0, $\Delta n$: 0.137, and elastic constant: 1.81.

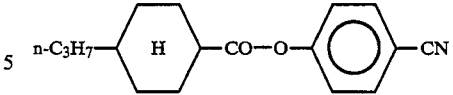 12.0%

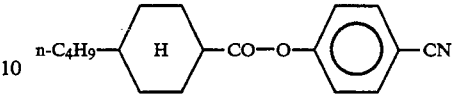 12.0%

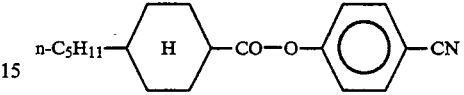 12.0%

-continued

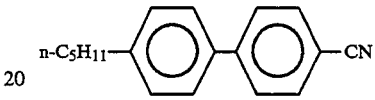 10.7%

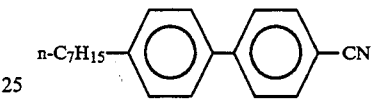 10.7%

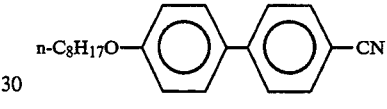 10.7%

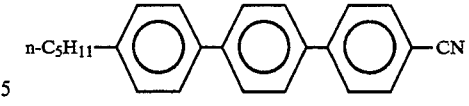 9.4%

 4.5%

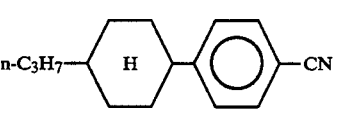 2.7%

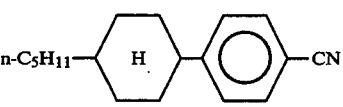 1.4%

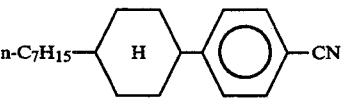 14.0%

EXAMPLES 9 to 14

There were prepared a 4-alkylbenzoic acid mixture (mixture 1) comprising 4-n-butylbenzoic acid and 4-n-pentylbenzoic acid in a ratio of 1 : 1, a 4-alkylbenzoic acid mixture (mixture 2) comprising 4-n-butylbenzoic acid, 4-n-pentylbenzoic acid and 4-n-hexylbenzoic acid in a ratio of 1 : 1 : 1, a 4-alkylbenzoic acid mixture (mixture 3) comprising 4-methylbenzoic acid, 4-n-butylbenzoic acid and 4-n-pentylbenzoic acid in a ratio of 1 : 2 : 2, and a 4-alkylcyclohexanecarboxylic acid mixture (mixture 4) comprising 4-n-propylcyclohexanecarboxylic acid, 4-n-butylcyclohexanecarboxylic acid and 4-n-propylcyclohexanecarboxylic acid in a ratio of 1 : 1 : 1.

Each of the 4-alkylbenzoic acid mixtures was mixed with the 4-alkylcyclohexanecarboxylic acid mixture in a ratio as specified in Table 1, and each of the resultant compositions was subjected to the measurement of viscosity (centipoise) at 20° C. and liquid crystal temperature range. The results are given in Table 1.

TABLE 1

|  | Comp. Ex. 3 | Ex. 9 | Ex. 10 | Ex. 11 | Ex. 12 | Ex. 13 | Ex. 14 |
|---|---|---|---|---|---|---|---|
| mixture 1 | — | 10 | 20 | 30 | — | — | — |
| mixture 2 | — | — | — | — | 50 | — | — |

TABLE 1-continued

|  | Comp. Ex. | Ex. | | | | | |
|---|---|---|---|---|---|---|---|
|  | 3 | 9 | 10 | 11 | 12 | 13 | 14 |
| mixture 3 | — | — | — | — | — | 10 | 50 |
| mixture 4 | 100 | 90 | 80 | 70 | 50 | 90 | 50 |
| viscosity | 32.9 | 29.6 | 27.2 | 25.9 | 24.3 | 30.3 | 22.6 |
| liquid crystal temp. range (°C.) | ~91 | 8 ~ 95 | 10 ~ 101 | 14 ~ 103 | 19 ~ 106 | 5 ~ 97 | 11 ~ 109 |

From the results given in Table 1, it is apparent that the addition of the 4-alkylbenzoic acid mixture to the 4-alkylcyclohexanecarboxylic acid mixture enables the viscosity of the liquid crystal composition to be remarkably lowered.

EXAMPLE 15

A nematic liquid crystal composition comprising the following components was prepared to measure the N-I point of the liquid crystal composition, viscosity (η: centipoise) of the liquid crystal composition at 20° C., and anisotropy (Δn) of refractive index at 25° C. The results were as follows. The nematic liquid crystal composition was very excellent from the practical viewpoint.

N-I point: 85° C., η: 26.5, and Δn: 0.117.

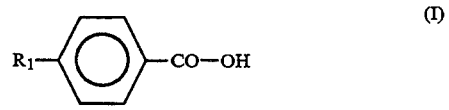

As is apparent from the results of each Example, the addition of the 4-alkyl- or 4-alkoxy-benzoic acid serves to raise the N-I point of the liquid crystal composition and increase the anisotropy of refractive index without any significant increase in the viscosity of the liquid crystal composition. In particular, the incorporation of a mixture of the 4-alkylbenzoic acid with the 4-alkylcyclohexanecarboxylic acid serves to lower the viscosity of the liquid crystal composition remarkably while maintaining the wide liquid crystal temperature range.

Therefore, the liquid crystal composition of the present invention is very excellent as a nematic liquid crystal for a TN cell, a host liquid crystal for a guest-host type display device or a liquid crystal for a time-sharing addressing type liquid crystal display device.

We claim:

1. A nematic liquid crystal composition comprising at least one member selected from 4-alkyl- or 4-alkoxy-benzoic acids represented by the following general formula (I):

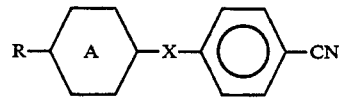

wherein $R_1$ stands for an alkyl or alkoxy group having 1 to 12 carbon atoms, and further comprising at least one aromatic nitrile compound of the formula

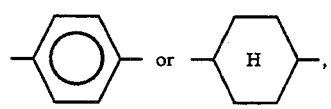

wherein

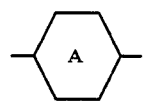

stands for

X stands for —CO—O— or a direct bond, and R stands for an alkyl or alkoxy group having 1 to 12 carbon atoms when

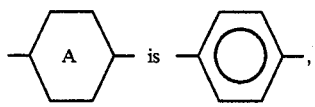

and R stands for an alkyl group having 1 to 12 carbon atoms when

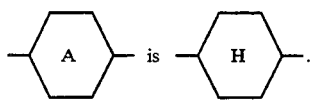

2. A nematic liquid crystal composition according to claim 1, wherein $R_1$ stands for an alkyl group having 1 to 12 carbon atoms.

3. A neamatic liquid crystal composition according to claim 1, wherein the aromatic nitrile compound is a compound represented by the following general formula (II).

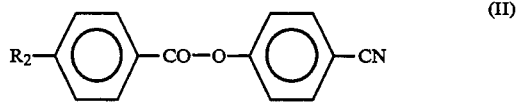

wherein $R_2$ stands for an alkyl or alkoxy group having 1 to 12 carbon atoms.

4. A nematic liquid crystal composition according to claim 1, wherein the aromatic nitrile compound is a compound represented by the following general formula (III):

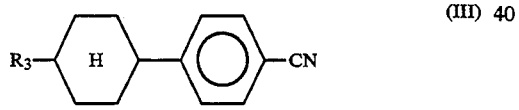

wherein $R_3$ stands for an alkyl group having 1 to 12 carbon atoms.

5. A carboxylic acid mixture comprising at least one member selected from 4-alkyl- or 4-alkoxy-benzoic acids represented by the following general formula (I) and at least one member selected from 4-alkylcyclohexanecarboxylic acids represented by the following general formula (IV):

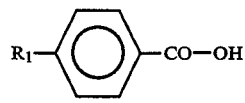

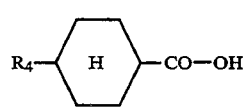

wherein $R_1$ stands for an alkyl or alkoxy group having 1 to 12 carbon atoms and $R_4$ stands for an alkyl group having 1 to 12 carbon atoms.

6. A carboxylic acid mixture according to claim 5, wherein $R_1$ stands for an alkyl group having 1 to 12 carbon atoms.

7. A nematic liquid crystal composition containing a carboxylic acid mixture according to claim 5.

8. A nematic liquid crystal composition according to claim 7, which further comprises at least one aromatic nitrile compound of the formula

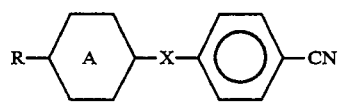

wherein

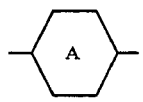

stands for

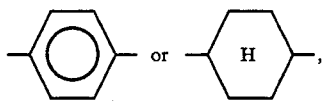

or
X stands for —CO—O— or a direct bond, and R stands for an alkyl or alkoxy group having 1 to 12 carbon atoms when

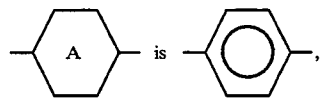

and R stands for an alkyl group having 1 to 12 carbon atoms when

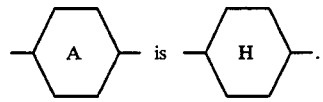

9. A nematic liquid crystal composition according to claim 8, wherein the aromatic nitrile compound is a compound represented by the following general formula (II):

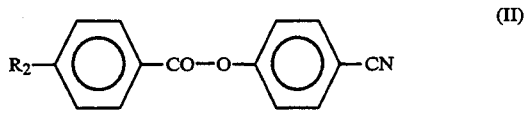

wherein $R_2$ stands for an alkyl or alkoxy group having 1 to 12 carbon atoms.

* * * * *